United States Patent [19]

Allemano

[11] Patent Number: 4,494,407
[45] Date of Patent: Jan. 22, 1985

[54] DEPTHOMETER FOR UNDERWATER DIVING

[76] Inventor: Emilio Allemano, Via Rosalino Pilo, 4, 10143 Torino, Italy

[21] Appl. No.: 376,332

[22] Filed: May 10, 1982

[30] Foreign Application Priority Data

Nov. 4, 1981 [IT] Italy .................... 68421 A/81

[51] Int. Cl.³ .................................. G01F 23/14
[52] U.S. Cl. ................................................ 73/300
[58] Field of Search ............... 73/300, 709, 756; 116/293, 294

[56] References Cited

U.S. PATENT DOCUMENTS

| | | | |
|---|---|---|---|
| 4,050,314 | 9/1977 | Longhetto | 73/300 X |
| 4,052,899 | 10/1977 | Longhetto | 73/300 |
| 4,107,996 | 8/1978 | Hollingsworth et al. | 73/300 |
| 4,196,690 | 4/1980 | Alinari | 73/300 X |

*Primary Examiner*—Gerald Goldberg
*Assistant Examiner*—Joseph W. Roskos
*Attorney, Agent, or Firm*—David A. Jackson; Daniel H. Bobis

[57] ABSTRACT

A depthometer useful for underwater diving is constructed with a cup-shaped casing, and a rotatable transparent cover that is sealably snap-mounted to the casing and closes the front of the casing. The transparent cover houses an indicating pointer that rotates about an axis of the casing as a function of external pressure, and moves along the scale of a stationary dial. The indicating pointer cooperates with a maximum-indicating pointer by way of a dragging member that communicates with both pointers. The dragging member is idly supported by an axially bored member which extends through the cover. The axially bored member cooperates with an adjustable friction clutch and thereby also serves to support the maximum-indicating pointer. The construction of the present depthometer permits the cover to be snap-mounted to the casing without adversely affecting the water-tightness of the instrument.

8 Claims, 2 Drawing Figures

DEPTHOMETER FOR UNDERWATER DIVING

BACKGROUND OF THE INVENTION

This invention relates to a depthometer for underwater diving.

In particular, the invention relates to a depthometer of the type comprising a substantially cup-shaped casing closed at its front by a cover or front glass window which is also substantially cup-shaped and is snap-coupled in a rotatable manner to the end of a side wall of the casing.

In general, in depthometers of the aforesaid type, water is prevented from entering the casing by a seal gasket disposed in contact with the outer lateral surface of the casing and cooperating with an inner lateral surface of the cover.

Because of the presence of said seal gasket, it is generally difficult to snap-mount the cover on to the casing because air is prevented from escaping from the casing as the cover becomes mounted thereon, so generating therein an overpressure which prevents the cover sliding axially relative to the casing.

In order to prevent this drawback, it is known to provide through the cover a bore which after assembly is closed by means of a screw or a similar removable device.

This solution to the problem has proved not without drawbacks, in that said bore represents a weakening of the casing cover, and the screw can be accidentally disturbed by the user, with the consequence that water enters the instrument.

SUMMARY OF THE INVENTION

The object of the present invention is to provide a depthometer of the type in which the cover is coupled rotatably to the casing in a sealed manner, and which is free from the aforesaid drawbacks, in that air can escape from the casing during assembly without requiring a special bore through the casing cover.

Said object is attained according to the present invention by a depthometer for underwater diving, comprising a cup-shaped casing sealed in a fluid-tight manner by a front cover snap-coupled to said casing and rotatable relative thereto about its own axis; the casing housing a pressure measuring device arranged to determine the pressure of the external environment, an indicating pointer operated by said pressure measuring device and rotatable about said axis and along a scale of a dial angularly rigid with said cover, a maximum-indicating pointer supported rotatable about said axis, and a dragging member disposed between said indicating pointer and said maximum-indicating pointer; characterised by comprising a tubular member comprising an axial bore closed externally in a fluid-tight manner by removable closure means; said dragging member being supported by said tubular member in such a manner as to rotate idly about said axis; and said maximum-indicating pointer being rotatably connected to said tubular member by way of adjustable friction means.

BRIEF DESCRIPTION OF THE DRAWINGS

Further characteristics and advantages of the present invention will be apparent from the description given hereinafter with reference to the accompanying drawings, which illustrate a non-limiting embodiment thereof, and in which.

DETAILED DESCRIPTION OF THE INVENTION

Figure 1:
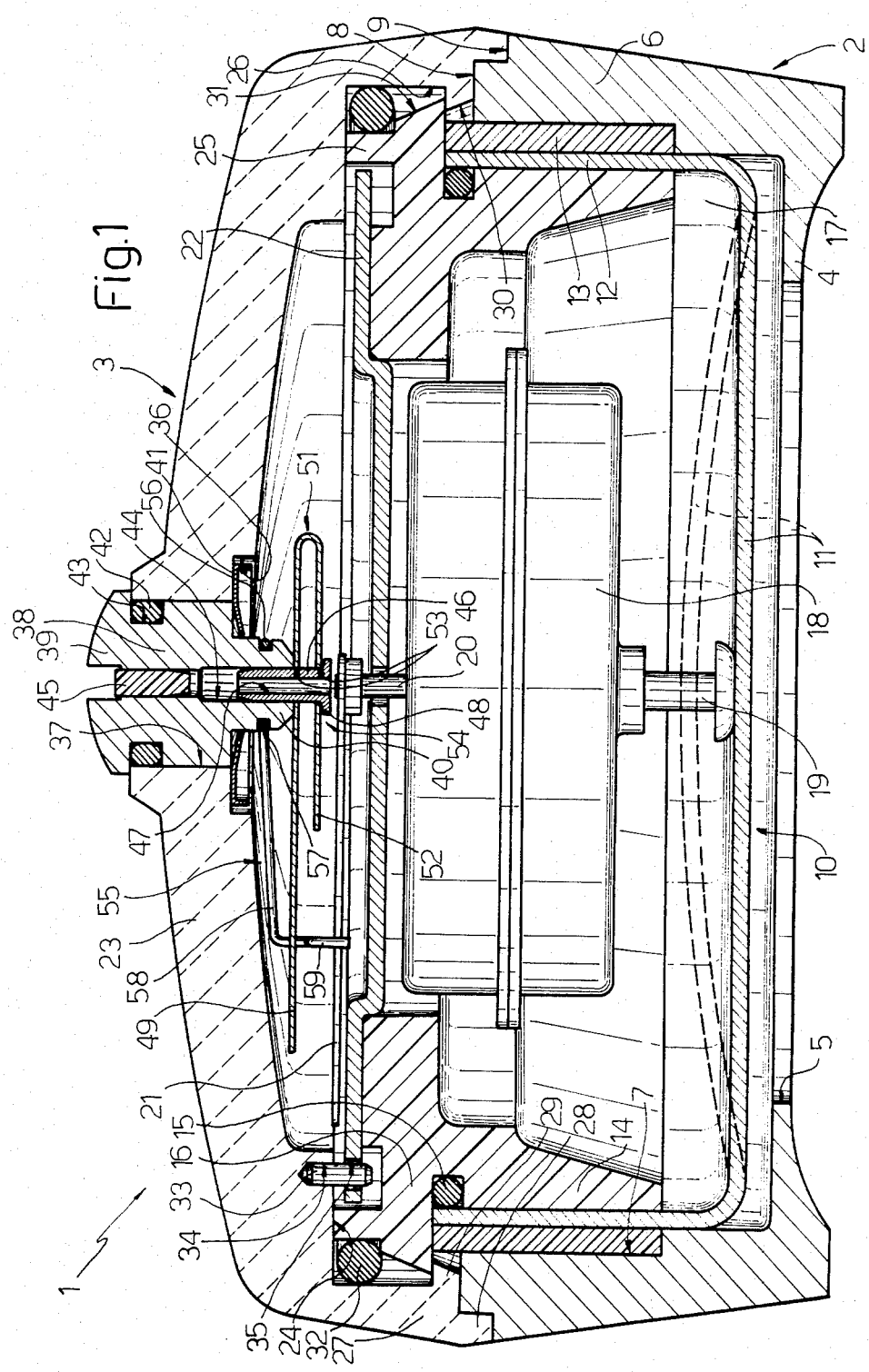
FIG. 1 is an axial section through a depthometer constructed in accordance with the present invention.

FIG. 1 illustrates a depthometer indicated overall by 1 and comprising a rear casing 2 of cup shape closed at its front by a cover 3 which is also of cup shape, and is constructed of transparent material.

The casing 2 comprises a base wall 4 provided with a substantially circular central bore 5, and a substantially cylindrical side wall 6 provided internally with an annular seat 7, and bounded at its free end by a flat annular surface 8 comprising an annular groove 9 along its outer periphery.

Inside the casing 2 there is housed a cup-shaped metal member 10, the base wall of which is constituted by a flexible diaphragm 11 disposed facing the bore 5, and rigid along its outer periphery with a cylindrical side wall 12, the free end of which extends outside the surface 8 of the casing 2. An end portion of the wall 12 is clamped between an outer rigid ring 13 housed in the annular seat 7, and a tubular appendix 14. This latter is coupled to the inner surface of the wall 12 by way of a seal gasket 15, and extends axially from an annular plate 16, a flat surface of which is disposed facing the surface 8 and extends outside the wall 12 and outside the rigid ring 13, and is in contact with the free ends of these latter.

The annular plate 16 and the cup member 10 together define a chamber 17, in which there is housed a pressure measuring device 18 provided with a slidable feeler 19 coaxial to the casing 2 and disposed in contact with the central portion of the diaphragm 11. The pressure measuring device 18 comprises a rotatable exit shaft 20 arranged to make angular movements about its axis which are proportional to the axial movements of the feeler 19. On the shaft 20 there is keyed an indicating pointer 21, arranged to rotate together with the shaft 20 in such a manner as to move along a scale (not shown) graduated in meters, traced on a circular dial 22 traversed by the shaft 20 and disposed facing the cover 3.

The cover 3 comprises an outwardly convex base wall 23 which is bounded along its inner periphery by a flat annular surface 24 coaxial to the shaft 20 and parallel to the dial 22. The annular surface 24 is disposed in contact with the free end of an annular rib 25 extending axially from that surface of the annular plate 16 opposite that carrying the tubular appendix 14, and is bounded externally by the inner cylindrical surface 26 of a cylindrical side wall 27 of the cover 3. The wall 27 is disposed in a position substantially coaxial to the shaft 20, and comprises at its free end an axial annular appendix 28 engaged in the annular groove 9, and a radial appendix 29 extending radially inwards from the cylindrical surface 26.

The radial appendix 29 extends in contact with the surface 8 of the casing 2, and is bounded at its free end by a frusto-conical surface 30 which, as the cover 3 is being assembled on the casing 2, cooperates with a frusto-conical lateral surface 31 of the annular plate 16, to finally snap below this latter so as to axially lock the cover 3 on the casing 2 by snapping. The seal between this latter and the cover 3 is ensured by an annular gasket 32 clamped between the cylindrical surface 26 of the cover 3 and an outer cylindrical surface of the annular rib 25.

The gasket 32 acts as a brake for the rotation of the cover 3 on the casing 2, but still enables the user to set the cover 3 in any angular position relative to the casing 2, and consequently to adjust the angular position of the dial 22. This is because this latter simply rests on the annular plate 16, and is connected angularly to the cover 3 by a pin 33, one end of which is fixed into a dead bore 34 provided in the annular surface 24, its free end extending through a bore 35 provided through the dial 22.

A cylindrical cavity 36 is provided centrally in the inner surface of the wall 23 of the cover 3, and in its base surface there is provided a through bore 37 extending through the wall 23 and engaged in a sealed manner by a tubular member 38. This latter is provided at one end with a head 39 cut diametrically on its exterior and cooperating with the outer surface of the wall 23, and at its other end with an axial appendix 40 which extends to the outside of the depthometer 1 and is coupled to a resilient ring 41 housed in the cylindrical cavity 36 and copperating with the appendix 40 in order to lock the member 38 such that its head 39 is in contact with the outer surface of the wall 23. The seal between the member 38 and side wall of the bore 37 is provided by a gasket 47 compressed between the surface of the bore 37 and the base of an annular groove 43 provided in the lateral surface of the member 38.

Through the member 33 there is provided an axial bore 44, the outer and inner ends of which are engaged respectively by a pin or plug 45 forced into the bore 44, and by a tubular pin 46 forced lightly into the bore 44 and axially adjustable. The pin 46 comprises a through axial bore 47 coaxial to the bore 44, and is provided at that end facing the interior of the depthometer 1 with a radial flange 48, its distance from an end surface of the appendix 40 being adjustable on assembly by forcing the pin 46 to a greater or lesser extent into the bore 44.

The pin 46 constitutes a support for a maximum-indicating pointer 49, which extends from the end of a first arm 50 of a U-shaped fork 51 in the form of a metal strip, which comprises a second arm 52 substantially parallel to the arm 50. The arms 50 and 52 are traversed by respective coaxial bores 53 engaged by the tubular pin 46. More specifically, as shown in FIG. 1, the arm 50 extends in contact with the free end of the appendix 40, whereas the arm 52 extends in contact with the radial flange 48 of the tubular pin 46. This latter and the fork 51 constitute an adjustable friction clutch 54 able to lock the maximum-indicating pointer in position relative to the axis of the tubular pin 46.

The maximum-indicating pointer 49 is rotated about the axis of the pin 46, following a movement of the indicating pointer 21 in the direction of increasing values on the scale traced on the dial 22, by a dragging member indicated overall by 55 and preferably constructed of metal wire.

Figure 2:
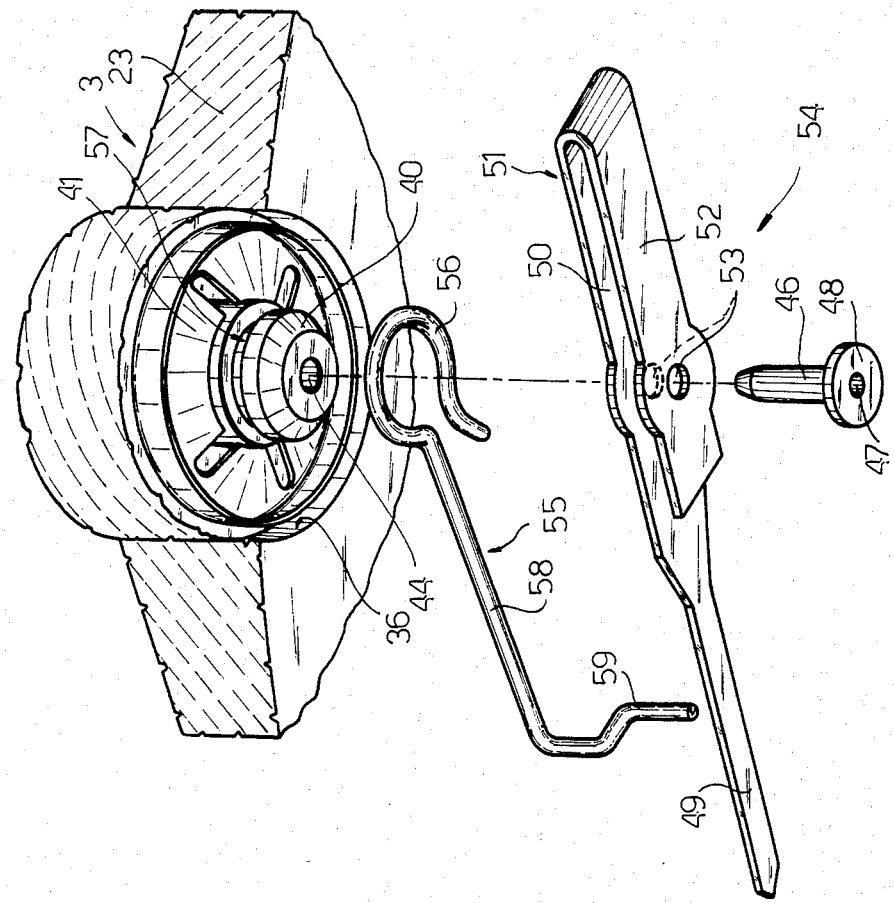
FIG. 2 is a partly sectional exploded view of an enlarged detail of FIG. 1.

As shown in particular in FIG. 2, the dragging member 55 comprises an end portion 56 of open ring configuration snap-mounted on the appendix 40 so as to engage a groove 57 provided therein, a radial arm 58 extending outwards from the appendix 40 into the space between the pointer 49 and the inner surface of the wall 23 of the cover 3, and an appendix 59 extending from the free end of the arm 58 in a direction substantially parallel to the axis of the casing 2 towards the dial 22, and of sufficient length to interfere both with the maximum-indicating pointer 49 and with the indicating pointer 21, and arranged to come into contact with the maximum-indicating pointer 49 at that surface of this latter which faces decreasing values of the scale traced on the dial 22.

During assembly, the member 38 already provided with the gasket 42 is firstly mounted on the cover 3 while this is still separated from the casing 2, followed by the resilient locking ring 41 so as to make the member 38 rigid with the cover 3. On to the appendix 40 of the member 38 is then snapped the terminal ring portion of the dragging member 55, which when mounted can rotate about the axis of the member 38. Finally, the maximum-indicating pointer 49 is mounted by inserting the pin 46 through the bores 53 of the fork 51 and into the inner terminal part of the bore 45 in the member 38. As stated heretofore, the pin 48 is engaged with the bore 44 under slight forcing, this enabling the pin 46 to be locked in any axial position relative to the appendix 40, and thus to adjust the distance between the flange 48 and the end of the appendix 40 within a relatively wide range at will, so as to vary the distance between the arms 50 and 52 and thus the torque which can be transmitted by way of the adjustable friction clutch 54 as required.

The cover 3 is then mounted on the casing 2 by bringing the surfaces 30 and 31 into contact with each other and applying an axial thrust to cause the wall 27 to bend resiliently outwards and the appendix 29 to then snap under the plate 16, so axially locking the cover 3 on the casing 2.

The assembly as heretofore described is facilitated considerably by the fact that the chamber 17 is connected to the outside by way of the bore 44, which is still devoid of the closure pin 45 and is always open at its inner end because of the presence of the bore 47 in the pin 46. In this respect, this communication prevents the formation of an overpressure inside the chamber 17 when, as the cover 3 is being mounted on the casing 2, the gasket 32 comes into contact with the outer surface of the rib 25 to create a seal between the casing 2 and cover 3, so tending to prevent any further axial movement of this latter relative to the casing 2.

The aforesaid assembly is finally completed, as stated, by forcing the pin 45 into the bore 44.

In operation, when the user is immersed and has allowed the depthometer 1 to reach the temperature of the water, he adjusts it to zero depth by rotating the cover 3 and thus the dial 22 relative to the indicating pointer 21, until this latter coincides with the zero on the scale (not shown) traced on the dial 22. In this manner, any reading errors due to the altitude of the diving locality, the temperature etc. are compensated. The user then rotates the member 39, suitably provided with an outer diametrical operating slot, until the maximum-indicating pointer 49 lies over the indicating pointer 21 in such a manner that this latter is in tight contact with the appendix 59 of the dragging member 55.

During subsequent diving, the pointer 21 moves along the scale of the dial 25 under the control of the pressure measuring device 18 as a function of the external pressure, so that during its movement in the direction of increasing values on said scale it conveys the maximum-indicating pointer 49 with it by means of the appendix 59. This latter does not however transmit any movement to the maximum-indicating pointer 49 when the indicating pointer 21 moves in the direction of decreasing values on said scale.

On termination of diving, the indicating pointer 21 obviously returns to zero, whereas the maximum-indicating pointer 49 remains at rest, by the effect of the friction clutch 54, in the position relative to the maximum depth reached.

By adjusting the friction clutch 54, which is done by inserting the pin 46 into the bore 44 to a greater or lesser degree, each instrument can be precisely set so that the pointer 49 moves with the pointer 21 while offering the minimum resistance necessary to maintain it in position when no longer urged by the appendix 59.

With regard to the dragging member 55, it should be noted that its particular shape proves extremely advantageous when, as often happens, the scale of the dial 22 extends along an arc which subtends an angle at the centre of between 360° and 720°. This is because in this case, if the maximum-indicating pointer 49 abandons the indicating pointer 21 after making a rotation exceeding 360°, it can return to zero without engaging the pointer 49 after one complete turn, but instead conveys only the dragging member 55 in the direction of decreasing scale values.

Within the principle of the invention, numerous modifications can be made to the described depthometer 1 without leaving the scope of the inventive idea.

What we claim is:

1. A depthometer for underwater diving, comprising a cup-shaped casing (2); a front cover (3) snap-coupled axially to said casing (2) in a fluid-tight manner and rotatable relative thereto about its own axis; a pressure measuring device (18) arranged within said casing (2) to determine the pressure of the external environment; a dial (22) angularly rigid with said cover (3); an indicating pointer (21) operated by said pressure measuring device (18) and rotatable about said axis and along a scale of said dial (22); a maximum-indicating pointer (49) supported rotatable about said axis; a dragging member (55) disposed between said indicating pointer (21) and said maximum-indicating pointer (49); a tubular member (38) extending through said cover (3) and comprising an axial bore (44); and removable closure means (45) closing said bore (44) in a fluid-tight manner; said dragging member (55) being supported by said tubular member (38) in such a manner as to rotate idly about said axis; and adjustable friction means (54) being provided to connect said maximum-indicating pointer (49) to said tubular member (38) in a rotatable manner.

2. A depthometer as claimed in claim 1, characterised in that said friction means (54) comprise tubular support means connected to said tubular member and extending axially therefrom towards said dial (22) through an adjustable length.

3. A depthometer as claimed in claim 2, characterised in that said tubular support means comprise a tubular pin (46) which extends through an adjustable length inside the inner end of said bore (44) and is coupled to said maximum-indicating pointer (49).

4. A depthometer as claimed in claim 3, characterised in that said tubular pin (46) comprises a portion (48) projecting in a radial direction, at that free end thereof which projects from said bore (44) and faces said dial (22); said adjustable friction means (54) also comprising an element (51) of elastically deformable material mounted rotatably on said tubular pin (46) and compressed in an adjustable manner between said projecting portion (48) thereof and the inner end of said tubular member (38); said maximum-indicating pointer (49) extending from said deformable element (51) and being angularly rigid therewith.

5. A depthometer as claimed in claim 1, characterised in that said removable closure means comprise a pin (45) forcibly inserted into an outer end portion of said bore (44).

6. A depthometer as claimed in claim 1, characterised in that said dragging member (55) is arranged to bring said pointers (21, 49) into mutual rigid contact when said indicating pointer (21), in moving towards increasing values of said scale, attains and exceeds the value indicated on said scale by said maximum-indicating pointer (49), and comprises a connection portion (56) idly coupled to said tubular member (38) so as to rotate relative to this latter about said axis, and an appendix (59) parallel to said axis and arranged to come into contact with said maximum-indicating pointer (49) at that surface of this latter which faces decreasing values of said scale, said appendix (59) occupying a portion of the space swept by said indicating pointer (21) during its movements along said scale.

7. A device as claimed in claim 6, characterised in that said dragging member (55) comprises an arm (58) disposed radially to said axis and rigidly connected to said appendix (59); said connection portion being constituted by a laterally open resilient ring (56) rigid with said arm (58), and said tubular member (38) being provided with an annular groove (57) coaxial to said axis and snap-engaged in a rotatable manner with said open ring (56).

8. A device as claimed in claim 1, characterised in that said dragging member (55) is constituted by a single piece of bent metal wire.

* * * * *